United States Patent
Mezaael

(10) Patent No.: US 11,830,055 B2
(45) Date of Patent: Nov. 28, 2023

(54) DYNAMIC DELIVERY OF CROWDSOURCED TRAVEL PLANNING INFORMATION

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 684 days.

(21) Appl. No.: 16/670,997

(22) Filed: Oct. 31, 2019

(65) Prior Publication Data

US 2021/0133847 A1    May 6, 2021

(51) Int. Cl.
| | |
|---|---|
| G06Q 30/00 | (2023.01) |
| G06Q 30/0601 | (2023.01) |
| G06Q 10/0836 | (2023.01) |
| G06N 20/00 | (2019.01) |
| G06Q 50/30 | (2012.01) |

(Continued)

(52) U.S. Cl.
CPC ....... *G06Q 30/0631* (2013.01); *G01C 21/343* (2013.01); *G06N 20/00* (2019.01); *G06Q 10/02* (2013.01); *G06Q 10/0836* (2013.01); *G06Q 50/30* (2013.01)

(58) Field of Classification Search
CPC .............. G06Q 30/0631; G06Q 10/02; G06Q 10/0836; G06Q 10/06315; G06Q 50/14; G06Q 50/30; G06N 20/00; G01C 21/343; G01C 21/3484; G06F 16/9536
See application file for complete search history.

(56) References Cited

U.S. PATENT DOCUMENTS

| | | | |
|---|---|---|---|
| 7,876,214 B1 | 1/2011 | Brady, Jr. | |
| 8,965,824 B2 * | 2/2015 | Chun | G06Q 10/06375 706/46 |
| 9,124,955 B2 * | 9/2015 | Geva | G16H 40/67 |

(Continued)

FOREIGN PATENT DOCUMENTS

| | | |
|---|---|---|
| CN | 104081158 B | 2/2018 |
| WO | WO-2017197208 A1 * | 11/2017 |

OTHER PUBLICATIONS

"Airlines Face Ebola Fallout," by Kathryn A. Wolfe, Politic, LLC, Oct. 1, 2014 (Year: 2014).*

*Primary Examiner* — Anne M Georgalas
(74) *Attorney, Agent, or Firm* — Brandon Hicks; Eversheds Sutherland (US) LLP

(57) ABSTRACT

Technologies are provided for dynamic delivery of travel planning information based at least on a travel condition. The travel planning information can be crowdsourced from multiple supplier accounts and can be retained in a distributed storage platform. Some embodiments of the technologies include a computing system that can receive data identifying travel conditions of a subject from a mobile user equipment (UE). The travel conditions can include a health condition and/or biometric data. The mobile UE can be a portable computing device or a vehicle. The computing system can determine that a rule to provide travel planning information is satisfied, and then can acquire specific travel planning information using at least one of the travel conditions. The computing system can provide the first travel planning information to the mobile UE.

15 Claims, 10 Drawing Sheets

(51) Int. Cl.
*G01C 21/34* (2006.01)
*G06Q 10/02* (2012.01)

(56) References Cited

U.S. PATENT DOCUMENTS

| | | | | |
|---|---|---|---|---|
| 9,633,402 | B1* | 4/2017 | McCartney | G06Q 30/0629 |
| 9,883,369 | B2* | 1/2018 | Ulmansky | H04W 4/70 |
| 10,495,474 | B2* | 12/2019 | Szubbocsev | G01C 21/3415 |
| 10,573,093 | B2* | 2/2020 | Breed | G07C 5/008 |
| 10,703,204 | B2* | 7/2020 | Hassan | B60K 28/14 |
| 10,706,605 | B1* | 7/2020 | Russo | G06T 13/00 |
| 10,937,259 | B1* | 3/2021 | Horvatich | G07C 5/0825 |
| 10,953,888 | B2* | 3/2021 | Wilson | B60W 60/0016 |
| 11,107,171 | B2* | 8/2021 | Handler | G06Q 10/025 |
| 11,119,490 | B1* | 9/2021 | Christensen | G08G 1/012 |
| 2009/0313055 | A1* | 12/2009 | Martin | G06Q 10/02 |
| | | | | 705/5 |
| 2010/0042394 | A1* | 2/2010 | Khan | G16H 50/20 |
| | | | | 703/11 |
| 2011/0161121 | A1* | 6/2011 | Nagpal | G06Q 10/02 |
| | | | | 705/5 |
| 2016/0364823 | A1 | 12/2016 | Cao | |
| 2017/0337287 | A1* | 11/2017 | Gill | G06F 16/27 |
| 2017/0343365 | A1 | 11/2017 | Mokhnatkina et al. | |
| 2019/0017835 | A1* | 1/2019 | Pickover | G06N 5/003 |
| 2021/0034053 | A1* | 2/2021 | Nikolic | G08G 5/025 |

* cited by examiner

DYNAMIC DELIVERY OF CROWDSOURCED TRAVEL PLANNING INFORMATION

BACKGROUND

Transportation vehicles and services have evolved from a limited number of offerings to a wide array of choices. With the advent of air travel, people nowadays travel to distant destinations inside a country as well as to faraway places located in foreign countries. Travel at these distant destinations and faraway places may be carried out by using various transportation services such as airplanes, trains, and buses, just to name a few examples. However, it is often confusing and intimidating to use these transportation services due to various factors, such as unfamiliarity with a language, unfamiliarity with local currencies, unfamiliarity with methods of payment, unfamiliarity with the geography of a place, unfamiliarity with local customs, and unfamiliarity with the availability of alternative modes of transport.

Therefore, much remains to be improved in conventional technologies that provide transportation guidance to a traveler when faced with such situations.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Overview

The disclosure recognizes and addresses, among other technical challenges, the issue of providing travel information to user equipment (UE). The disclosure provides technologies for dynamic delivery of travel planning information based on a travel condition. The travel planning information can be crowdsourced from multiple supplier accounts and can be retained in a distributed storage platform. To that end, an embodiment of the disclosed technologies includes a computing system that can receive data identifying travel conditions of a subject from a mobile UE. The travel conditions can include, for example, a health condition and/or biometric data. The mobile UE can be embodied in a portable computing device or a vehicle. The portable computing device can be a computing device that can send and receive information wirelessly. The computing system can determine that a rule to provide travel planning information is satisfied, and then can generate first travel planning information using at least one of the travel conditions. The computing system can provide the first travel planning information to the mobile UE.

Embodiments of the disclosed technologies are not limited to computing systems. Other embodiments include techniques, computer-program products, computing devices, and the like. Indeed, the principles and practical elements disclosed herein can be implemented in any equipment that includes computing resources (software, firmware, processors, memory devices, other hardware, etc.) or that is controlled by one or multiple processors. Such equipment is not limited to mobile computing devices or a computing server device. Other types of computing devices can be utilized to implement the functionalities of the technologies described herein.

While some embodiments of the disclosed technologies are illustrated with reference to a portable computing device and an automobile, the disclosure is not so limited. Indeed, the principles and practical elements disclosed herein can be applied to other types of communication devices and vehicles. The communication devices can be embodied in wireless or tethered computing devices that can send and receive information wirelessly and/or via a wireline connection. A tethered computing device can be a desktop computer, a home appliance with an embedded computing device, a voice-over-internet-protocol (VoIP) telephone, a two-way communication device, or similar. The other types of vehicles can include aircraft, boats, school buses, and the like.

Illustrative Embodiments

Figure 1:
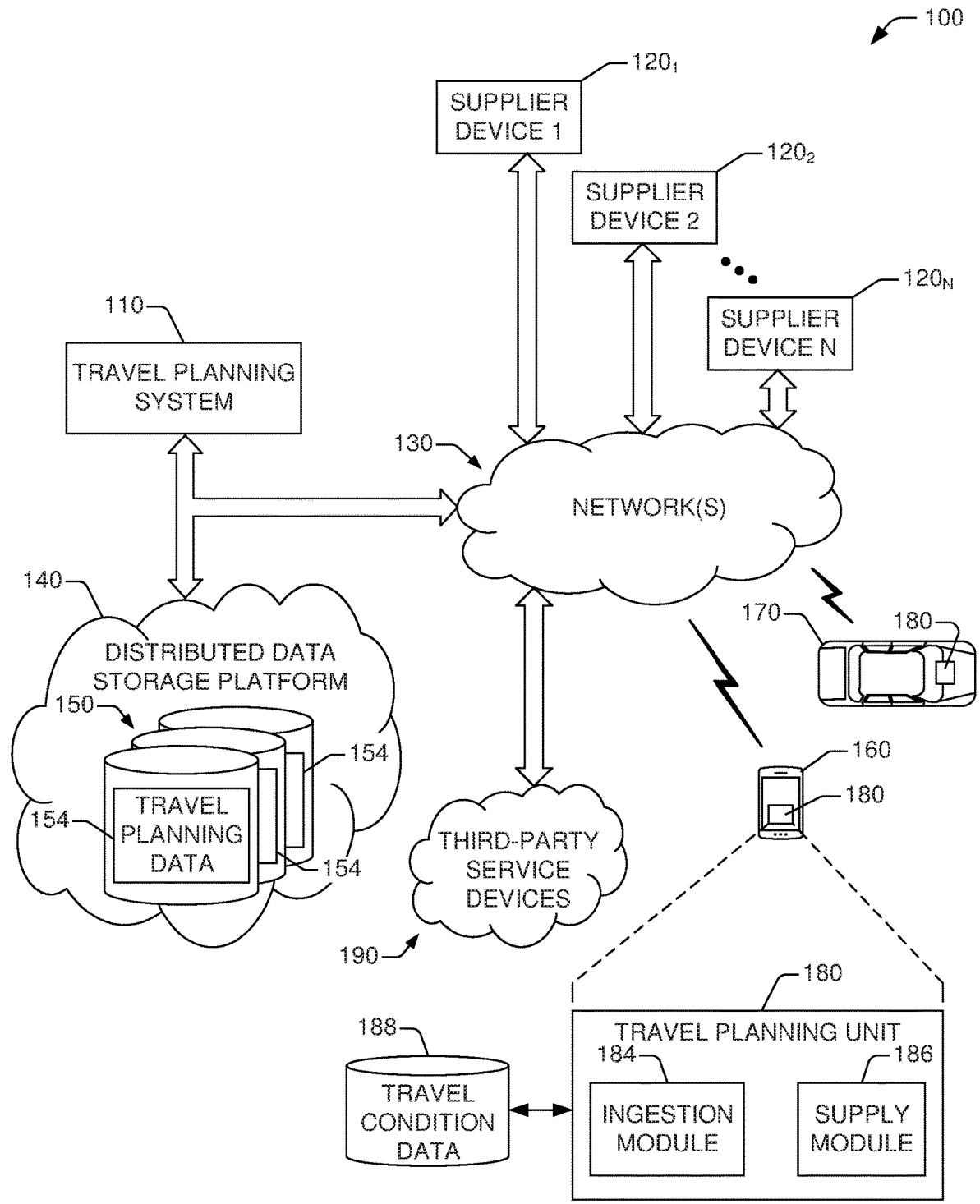
FIG. 1 presents an example of an operational environment for dynamic delivery of crowdsourced travel information, in accordance with one or more embodiments of the disclosure.

Referring to the drawings, FIG. 1 illustrates an example of an operational environment 100 that supplies travel planning information in accordance with one or more embodiments of this disclosure. The operational environment 100 includes a travel planning system 110 that can access travel data from multiple sources. The travel data can identify features of travel itineraries. The multiple sources can include multiple supplier accounts. For the sake of illustration, a supplier account contains records that define an end-user and service(s) that can be utilized by the end-user. At least one of the service(s) can provide access to a digital content channel that permits posting travel information. The end-user defined by the supplier account can be a frequent traveler, a travel expert, a travel agent, a resident of a travel destination or another particular location, or similar.

The multiple supplier accounts can be hosted by the travel planning system 110 or a third-party platform (e.g., a social media platform; not depicted in FIG. 1). In some embodiments, a first subset of the multiple supplier accounts can be hosted by the travel planning system 110, and a second subset of the multiple supplier accounts can be hosted by the third-party platform. The third-party platform can be a social media platform, for example. One or many of the third-party service devices 190 can form the third-party platform. Supplier accounts (not depicted in FIG. 1) hosted by the travel planning system 110 can be retained in the distributed data storage platform 140, within one or many of the data storage devices 150 for example. The supplier accounts can be hosted by the travel planning system 110 and/or the third-party platform in response to a prompt to supply travel data. The prompt presented to an end-user in a computing device. As such, the travel data may be referred to as crowdsourced travel data.

Figure 2:
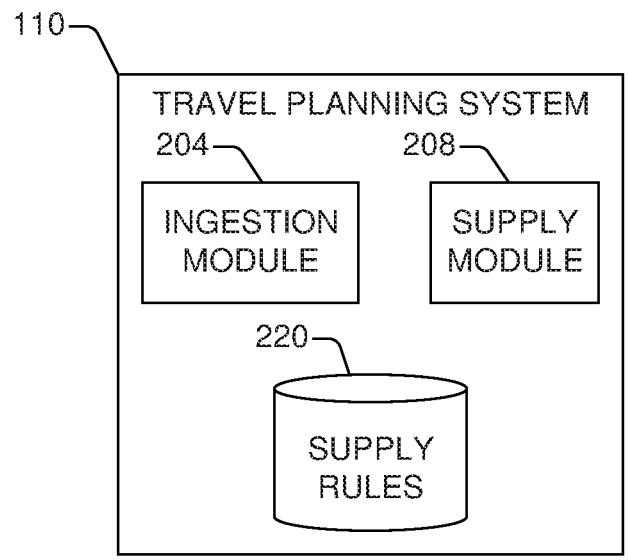
FIG. 2 presents an example of a computing system for dynamic delivery of crowdsourced travel information, in accordance with one or more embodiments of the disclosure.

A user device or another type of UE that is utilized to access a subscriber account is referred to as a supplier device. The supplier device can receive input information identifying particular travel data. The travel planning system 110 can receive travel data from multiple supplier devices, each being utilized to access a supplier account. As is illustrated in FIG. 1, the travel planning system 110 can receive the travel data from N supplier devices: a first reviewer device $120_1$, a second reviewer device $120_2$, and so forth up to an N-th supplier device $120_N$. While N is illustrated as being greater than two, the embodiments are not limited in that respect and, in some instances, two or fewer supplier devices can be utilized to provide travel data. A supplier device can be a portable computing device, a connected vehicle, a desktop computer, or similar In some embodiments, as is illustrated in FIG. 2, the travel planning system 110 can include an ingestion module 204 that updates received travel data according to aspects described herein.

In response to receiving travel data from one or many supplier devices (at least one of the supplier devices $120_1$-$120_N$), the travel planning system 110 can update extant travel planning information with the received travel data. Updating the extant travel planning information can include classifying the received travel data into a defined category of travel information, and adding the travel data to extant data in the defined category. For example, such classification can result in a catalog of travel information, such as a catalog of points of interest in a particular region; a catalog of landmarks or other natural formations (e.g., a hidden lake or a waterfall) in a particular region; a catalog of restaurants or other types of eateries (e.g., a three-star restaurant); a catalog of preferred transportation means in a particular region during particular days and/or particular times of day; or similar. In some embodiments, the ingestion module 204 (FIG. 2) can update the received travel data according to aspects described herein.

As part of updating the extant travel planning information, the ingestion module 204 can analyze travel data received from supplier account(s) based at least on regions from which the information is received and/or multiple other factors. Such factors can include, for example, previous data and/or trips from a traveler; review data from the traveler; rating data from the traveler; feedback and/or survey data from the traveler; a combination thereof; or similar. In addition, or in some configurations, at least some of the factors can be based on monitoring connected mobile user equipment travelling using various transportation means, such as connected vehicle, bike, scooter, train, airplane, or a combination thereof, and relying on smart infrastructure or other types of infrastructures, or both.

Further, or in yet other configurations, at least some other factors can be based on monitoring responses from travelers to their respective traveling plans and respective routing experiences. For the sake of illustration, a routing experience can include what travelers visit the most in a particular region; which transportation mean or platform that most travelers seem to arrive late to; which items travelers buy during specific time of year (e.g., during carnival celebrations in Brazil) or a particular season; what travelers from one region (e.g., travelers from Brazil) drink and/or eat the most when visiting another region (e.g., a location in Argentina); and the like.

The travel planning system 140 can retain updated travel planning information in a distributed data storage platform 140 that includes multiple data storage devices 150. In some embodiments, a first subgroup of the multiple data storage devices 150 can constitute a first data center, and a second subgroup of the multiple data storage device 150 can constitute a second data center. The first data center and the second data center can be geographically separated. Accordingly, in one of those embodiments, a first data storage device of the multiple data storage devices 150 can be located in a first location. In addition, a second data storage device of the multiple data storage devices 150 can be located in a second location remote from the first location.

The updated travel planning information can be retained in one or several ones of the multiple data storage devices 150. Each one of the multiple data storage devices 150 can include at least one memory device. Thus, the updated travel planning information can be retained within at least one memory device 154 (referred to as travel planning data 154).

The operational environment 100 also includes mobile UE. A mobile UE includes computing resources and communication resources. The computing resources include, for example, one or more processors; one or more memory devices; other types of computing resources; a combination thereof; or the like. The processor(s) can include, for example, central processing unit(s) (CPU(s)); graphical processing unit(s) (GPU(s)); tensor processing unit(s) (TPU(s)); other types of processing circuitry; a combination of the foregoing; or similar. The other types of computing resources can include, for example, an operating system (O/S); firmware; virtual memory; a main memory device; interface(s) (I/O interface devices, programming interface(s) (such as application programming interfaces (APIs), etc.); a combination of the foregoing; or similar.

In one configuration, at least some of the computing resources can be arranged in a computing device. The computing device can include, for example, one or many processors and one or many memory devices. At least one of the communication resources can permit exchanging data and signaling between components of the computing device. At least a second one of the communication resources can permit sending, receiving, and/or exchanging data and signaling with an electronic device external to the computing device.

Thus, a mobile UE can be embodied in a portable computing device. In some instances, the portable computing device be embodied in a mobile telephone, a tablet computer, a laptop computer, a mobile gaming console, an electronic book reader (an e-reader), a navigation device, or similar In other instances, the computing device can be embodied in a wearable computing device, such as a watch, goggles or head-mounted visors, or the like.

Another mobile UE can be embodied in a vehicle. The vehicle can include a computing device integrated into the vehicle. The computing device can include, for example, one or many processors and one or many memory devices. The vehicle also can include communications resources that can permit exchanging data and signaling between components of the computing device. The vehicle can further include other communication resources that can permit sending, receiving, and exchanging data with an electronic device external to the vehicle. The vehicle can be a driverless autonomous vehicle or a driver-operated vehicle. Such an autonomous vehicle can be a taxi, a mass-transit bus, a school bus, a light rail vehicle, or similar In some embodiments, the vehicle can be electric. In other embodiments, the vehicle can rely on an internal combustion engine for locomotion.

As is illustrated in FIG. 1, the operational environment 100 includes a first mobile UE embodied in a portable computing device 160 and a second mobile UE embodied in a vehicle 170. The portable device 160 is represented as a smartphone and the vehicle 170 is represented as an automobile simply for the sake of illustration. While not shown in FIG. 1, in some situations, the portable computing device 160 can be located inside a vehicle (a taxi, mass-transit bus, or the like).

The travel planning system 110 also can receive data identifying travel conditions of a subject from a mobile UE, e.g., the portable computing device 160 or the vehicle 170, or both. The travel conditions can include numerous travel characteristics and/or personal characteristics of the subject. As an example, the travel conditions can include a health condition or biometric data, or both. The health condition can be one or a combination of pregnancy; an illness, such as a cold; the flu; a chronic disease (e.g., hypertension, heart disease or diabetes mellitus of type I or type II); a food allergy; food sensitivities (e.g., lactose intolerant); a medicine allergy; a phobia (claustrophobia, arachnophobia, and the like); or similar. The biometric data can define weight of the subject; age of the subject; height of the subject; blood pressure of the subject; body temperature of the subject; blood glucose level of the subject; a combination thereof; or other health measurements.

In addition, or as another example the personal characteristics of the subject can include type of a particular trip; clothing associated with the particular trip; number and type of items transported during the particular trip; travel preferences; travel interests; travel profile; food preferences; hobbies; a combination thereof; or the like. The type of the particular trip can include, for example, nature or terrain travel (such as a visit to a desert or dunes); landmark and monument visit; city visit or urban travel; shopping place and gift shop visit; or other types of visits. The clothing associated with the trip can include, for example, attire being worn (business clothes, sport clothes, etc.); clothes intended to be worn during the stay at a destination of the particular trip; clothes intended to be worn while traveling to the destination; a combination thereof; or similar. The type of item(s) being carried during the trip can include, for example, a stroller, a car seat, luggage, carry-on bags, or similar. Food preferences can include, for example, type of diet (vegetarian, pescatarian, ketogenic, low-carbohydrate diet, vegan, etc.); types of meals (Asian, Mexican, Japanese, halal, etc.). Travel preferences can include, for example, means of transportation (airplane, train, bus, car, etc.); travel route; preferred seating (priority seating, premium seat, aisle seat, window seat, or emergency exit seat); a combination thereof; or similar Travel interests can include, for example, preferred landmarks or point-of-interest (POIs) (e.g., archeological sites, historical sites, religious sites, etc.); sight scenes; areas to explore (e.g., preferred neighborhoods); and the like. A travel profile can include, for example, loyalty program identification, secure traveler number (TSA Pre-check, Clear identification, Global Entry, etc.), credit card numbers, emergency contact(s), and the like.

In order to send data identifying travel conditions of a subject, a mobile UE can include a travel planning unit 180 that can permit collecting such data at the mobile UE. As an illustration, both the portable computing device 160 and the vehicle 170 include the travel planning unit 180. Data or metadata, or both, defining travel condition(s) of a subject operating or otherwise associated with the mobile UE can be retained in one or more memory devices 188 (referred to as travel condition data 188). While the travel condition data 188 is shown in FIG. 1 as being external to the travel planning unit 180, the disclosed technologies are not limited in that respect. In some embodiments, at least a portion of the travel condition data 180 can be integrated into the travel planning unit 180.

More specifically, the travel planning unit 180 includes an ingestion module 184 that can cause the mobile UE—e.g., the portable computing device 160 or the vehicle 170—to present a user interface (UI) to receive data identifying a particular travel condition of the subject. In some embodiments, the UI can be presented in response to execution of the travel planning unit 180. For instance, the travel planning unit 180 can be a part of a web browser application or a mobile application executing in the mobile UE.

Such a UI can include, in one configuration, one or several UI elements that prompt entry of the data defining the particular travel condition. In one example, the UI element(s) can constitute a survey or another type of questionnaire prompting for answers defining such data. The mobile UE that presents the UI can send the data received by means of the UI element(s) to the travel planning system 110. The mobile UE can be the portable computing device 160 or the vehicle 170. In addition, or in another configuration, the UI can include one or several UI elements that permit selecting data available to the mobile UE as data identifying the particular travel condition. For example, the selected data can include information that characterizes an end-user of the mobile UE, calendar, routing, planning, destinations, reservations, choice of transportation means, budget, points, and the like. The selected data can be retained in the travel condition data 188, for example. The mobile UE that presents the UI can send the selected data to the travel planning system 110. Again, the mobile UE can be the portable computing device 160 or the vehicle 170.

Regardless of the mechanism to receive data identifying travel conditions of a subject, a mobile UE can send the data to the travel planning system 110. To that point, the travel planning unit 180 in the mobile UE can be functionally coupled to a communication unit (not shown in FIG. 1) and can include a supply module 186. The communication unit can include one or many antennas that can receive and send wireless signal conveying data or signaling, or both. The communication unit also can include a communication processing device that can process data according to one or many radio technologies. The data processed by the communication processing device can be received, for example, in a wireless signal received from a computing device external to the mobile UE. In another example, the data processed by the communication processing device can be generated by the supply module 186. The radio technologies can include, for example, 3G, Long Term Evolution (LTE), LTE-Advanced, 5G, IEEE 802.11, IEEE 802.16, Bluetooth, ZigBee, near-field communication (NFC), and the like.

Figure 3:
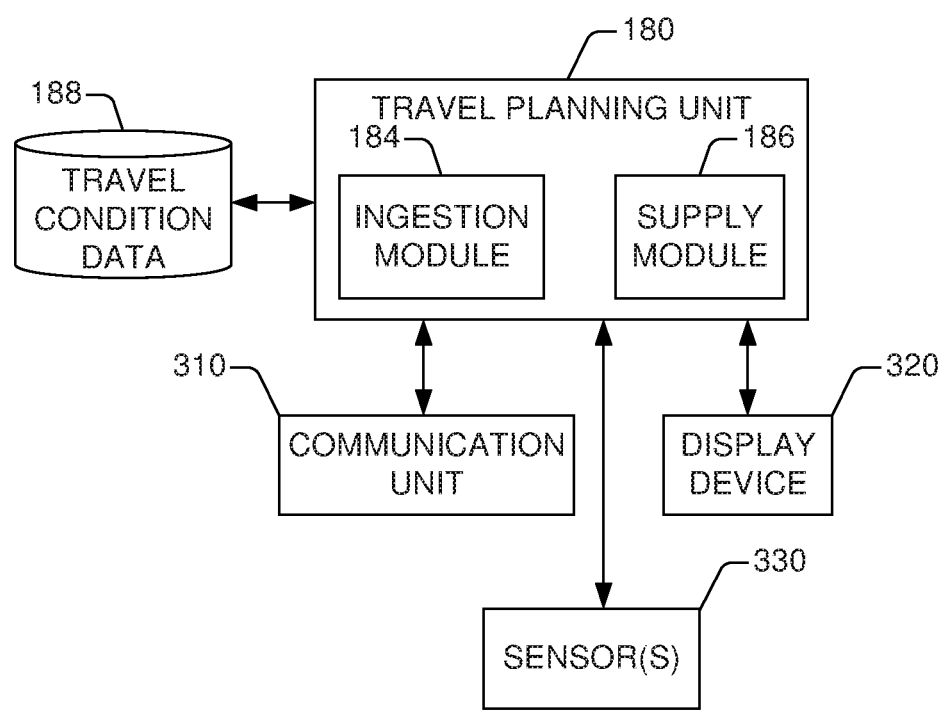
FIG. 3 presents an example of components of a mobile user equipment (UE) for dynamic delivery of crowdsourced travel information, in accordance with one or more embodiments of the disclosure.

In a particular embodiment, as is shown in FIG. 3, the travel planning unit 180 can be functionally coupled to a communication unit 310 that permits sending and receiving data and signaling wirelessly as is described herein, via at least one of the network(s) 130. The architecture of the communication unit 310 can be specific to the type of mobile UE—e.g., such an architecture in a portable computing device 160 can be different from another such architecture in the vehicle 170. Each network that forms the network(s) 130 (FIG. 1) has a defined footprint and can be a wireless network or a wireline network. The footprint can be, for example, one of a wide area network (WAN), a metropolitan area network (MAN), a local area network (LAN), a home area network (HAN), and/or a personal area network (PAN)). As an example, at least one the network(s) 130 can include a cellular network or a portion thereof and an internet protocol (IP) multimedia subsystem (IMS) platform.

The travel planning system 110 can receive data identifying travel condition(s) of a subject and can determine if a supply rule to provide travel planning information is satisfied. Such data can be received by means of one or many of the network(s) 130. As is illustrated in FIG. 2, the travel planning system 110 can include a supply module 208 that can analyze the data identifying the travel condition(s) and/or a state of an account associated with the mobile UE that provided the travel condition(s). The supply rule can be retained in one or more memory devices 220 (referred to as supply rules 220).

In response to determining that a supply rule is not satisfied, the travel planning system 110 can continue monitoring if the supply rule is satisfied in response to data received at a later time, identifying other travel condition(s) of the subject, for example. The supply module 208 (FIG. 2) can determine if the supply rule is satisfied at the later time in some embodiments. In the alternative, in response to determining that the supply rule is satisfied, the travel planning system 110 can acquire specific travel planning information using the satisfied supply rule or at least one of the travel condition(s), or a combination thereof. The specific travel planning information can be acquired using at least the travel planning data 154 retained in at least one of the data storage devices 150. In one configuration, the specific travel planning information can be acquired by selecting the specific travel planning information from the planning data 154 using a subset of the travel condition(s). In some embodiments, the supply module 208 (FIG. 2) can acquire the specific travel information.

The travel planning system 110 can provide the specific travel planning information to the mobile UE, either the portable computing device 160 or the vehicle 170, for example. The travel planning system 110 can provide the specific travel planning information by sending a notification message to the mobile UE, for example. The notification message can cause the mobile UE to present the specific travel planning information. The supply module 208 (FIG. 2) can send the notification message by means of at least one of the network(s) 130. Examples of the notification message include a short message service (SMS) message, a multimedia messaging service (MMS) message, an iMessage, an email message, or similar Another example of the notification message includes a message that is specific to a mobile application that embodies, or includes, the travel planning unit 180 and included in the mobile UE. Regardless of its type, the notification message includes the specific travel planning information in some configurations.

A communication unit 310 (FIG. 3) integrated into or otherwise functionally coupled to the travel planning unit 180 can receive such a notification message.

Prior to receiving the specific travel planning information, the mobile UE is configured to receive such information from the travel planning service provided by the travel planning system 110. The travel planning unit 180 can permit configuring the mobile UE. In an embodiment in which the travel planning unit 180 constitutes a mobile application in the mobile UE, the mobile UE can be configure to receive travel planning information in response to selection of a selectable visual element displayed as an option via the mobile application. Selection of the selectable visual element also can permit viewing specific types of travel planning information (such as recommendations, airfare sales, etc.).

In some embodiments, the travel planning unit 180 can detect location of the mobile UE or current status of a subject associated with the mobile UE, or both. In response, the travel planning unit 180 can request the travel planning system 110 to provide crowdsourced travel planning information. The subject can be an operator of the mobile UE, such as an end-user of a smartphone or a driver of a connected vehicle. Simply for the sake of illustration, the status of the subject can be, for example, a health condition; a reason for travel; a travel destination; attire worn by the subject; weather; an interest or preferences; available power in battery of mobile UE; appetite condition (hungry or satisfied, for example); a combination thereof; or similar. In other embodiments, some triggers may be applied when the mobile UE is sharing calendar information, which is an opportunity to provide crowdsourcing experience. In one example scenario, when a subject is travelling to a meeting, if location of the mobile UE allows enough time to include an activity or suggestion associated with subject's preference, the travel planning system 110 can send a suggestion for an option for routing to (e.g., Asian food eatery) at a discounted rate using a metro-train. The metro train fee may already be covered by the subject's full day pass, for example.

Subscribers of the travel planning service that have a known illness may receive authorized electronic notes from doctors regarding their illness (e.g., a phobia). The electronic notes can be received via one of the third-party devices 190. Presence of such a note in the travel planning system 110 can result in a supply rule being satisfied and specific travel planning information being acquired and provided to a mobile UE associated with a subscriber. For instance, the travel planning system 110 can detect a note identifying a subscriber as claustrophobic. In order to assist the subscriber with avoiding reserving and traveling in a confined space within a transportation means (a middle seat in an airplane, for example), the travel planning 110 can reserve a more spacious seat in the transportation means. In instances in which the transportation means is an airplane, the spacious seat can be a window seat, a seat in an emergency row, or a premium seat, for example. In addition, or as an alternative, the travel planning system 110 also can provide travel planning information defining routes that include scenery experiences that are typically less crowded. The travel planning system 110 also can assist with recommending and booking a hotel or other lodging space at intermediate location(s) between a travel origin and a travel destination, in cases a planned trip is long and a note identifying an illness of a traveler is present in the travel planning system 110. Similarly, the travel planning system 110 can provide travel planning information defining proper routes for meals/drinks during travel, and so forth.

More concretely, in order to provide travel planning information that includes a recommendation for a particular seat in a transportation means (an airline, a bus, a train, or similar), the travel planning system 110 can receive seat-chart data defining seating assignments for seats in the transportation means. The seat-chart data can be received from server device of a transportation system that administers travel in the transportation means. The server device can be included in the third-party service devices 190. In response to receiving the seat-chart data, the travel planning system 110 can identify the particular type of seat (e.g., a window seat, a premium seat, a luxury seat) and can generate the recommendation for the particular seat. The recommendation includes data identifying the particular seat. The travel planning system 110 can include the recommendation in the provided travel planning information.

In addition, or in other embodiments, the travel planning system 110 can reserve a particular seat in a transportation means for a traveler (either a healthy traveler or a traveler having health issues). The travel planning system 110 can include data defining the reservation in the travel planning information provided to a mobile UE corresponding to the traveler. In some configurations, in order to generate a reservation for the particular seat, the travel planning system 110 can locate the particular seat by accessing a server device of a transportation system that administers travel in the transportation means, and selecting the particular seat from seat-chart data retained in the server device or a data storage device coupled thereto. The server device and the data storage device can be included in the third-party service devices 190. The travel planning system 110 can then generate a reservation for the particular seat. To that end, the travel planning system 110 can exchange data or metadata, or both, with the server device. The exchanged data and/or metadata define the reservation, specifying the particular seat and the traveler, and optionally, travel preferences of the traveler (such as food restrictions, presence of support animal, or similar) The data and/or metadata can be exchanged by means of application programming interface(s) and one or several of the network(s) 130, for example. The API(s) permit accessing data and/or metadata from the server device, and sending other data and/or metadata to the server device from the travel planning 110.

In some embodiments, as is illustrated in FIG. 3, a mobile UE configured to receive travel planning information dynamically can include one or several sensors 330. At least one of the sensor(s) 330 can determine a physical condition by at least collecting data identifying the physical condition. Such data can be retained in the travel condition data 188. As an illustration, the physical condition can include body temperature, blood pressure, heart rate, concentration of sugar and/or a toxin in blood, and the like, of a subject using the mobile UE. To that end, each one of such sensor(s) 330 can include circuitry, structure (e.g., electrodes, microfluidic channels, or reactants, etc.), and/or chemicals or other materials suitable for collecting data identifying the physical condition.

Accordingly, one or a combination of the sensor(s) 330 may detect that a subject using the mobile UE has a cold or the flu, and may be contagious to other travelers while travelling. Such a detection can constitute a supply rule that is satisfied. More specifically, in one configuration, the detection of such a health condition causes the mobile UE to send a request message to the travel planning system 110 requesting travel planning information. The travel planning system 110 can receive the request message and, in response, the travel planning system 110 can acquire travel planning information by generating a recommendation for certain travel accommodations or another recommendation for pick-up location to obtain travel accessories that permit mitigating contagion. For example, the subject can obtain free masks at the pick-up location, discounted warm drinks, or similar items. In further response, or in some embodiments, the travel planning system 110 reserve an isolated seat for the subject in a particular transportation means (an airplane, a bus, a train, or similar) in order to provide a comfortable and safe travel for travelers surrounding the subject. Accordingly, the travel planning system 110 can locate the isolated seat by accessing a server device of a transportation system that administers travel in the transportation means, and selecting the isolated seat from seat-chart data retained in the server device or a data storage device coupled thereto. The server device and the data storage device can be included in the third-party service devices 190. The travel planning system 110 can then generate a reservation for the isolated seat. One or several of the network(s) 130 can permit the exchange of suitable data between the travel planning 110 and such a server device.

The disclosed technologies can provide additional or alternative mechanisms to supply travel planning information. Specifically, the travel planning system 110 can supply travel planning information customized to a traveler. Based on user connected data and behavior as technology evolves, many data can be collected to determine and associate the type of applicable suggestion and service to users on route. For example, the mobile UE can be an autonomous vehicle including a treadmill; a luxury cabinet including videogames and virtually reality (VR) goggles or other types of VR devices; a massage chair; an office environment; or a combination of the foregoing. In such an example scenario, the travel planning system 110 can receive user activity data corresponding to a subject associated with such an autonomous vehicle or similar autonomous vehicles, and can then generate travel planning information using at least the user activity data. The disclosed technologies are not limited to autonomous vehicles. For example, the travel planning system 110 can receive user activity data representative of a behavior of a subject associated with other equipment (a cruise ship, for example) or facilities in a particular region. The facilities can include restaurants, fitness centers, trampoline parks, and the like. The behavior can include usage of amenities and/or technologies that are present in such equipment or facilities. Both the amenities and technologies can be contemporaneous and available for early adoption, for example.

Accordingly, the ingestion module 204 (FIG. 4) can receive user activity data from a subscriber account of a subscriber to a travel planning service provided, at least partially, by means of the travel planning unit 180. The user activity data can include, for example, multiple records identifying respective actions of a subject corresponding to the subscriber account. Such user activity data can be received from a mobile UE (e.g., the portable computing device 160 or the vehicle 170) that includes the travel planning unit 180. In one example, the supply module 186 can send the user activity data. The ingestion module 204 can retain the user activity data in one or more memory devices 408 (referred to as user activity data 408 (FIG. 4)).

In some configurations, first defined actions of the respective actions can represent a specific online behavior of the subscriber. The specific online behavior can identify, for example, interests, hobbies, purchase preferences, professional activities of the subscriber. Purchase preferences can include, for example, preferred type of travel bookings and/or travel budgets. As such, the first defined actions can represent the type and budget that the subscriber chooses to travel through transportation means across regions. Some subscribers may always plan trips using premium and expensive options. Other subscribers may opt for low-cost or generally affordable alternatives when traveling.

In addition, or in other configurations, second defined actions of the respective actions can represent behaviors of the subscriber when utilizing the mobile UE. As an example, for a mobile UE embodied in the portable computing device 160, the second defined actions can include taking self-pictures at POIs, landmarks, and interesting sceneries. Accordingly, the second defined actions can indicate that the subscriber is frequently taking selfies and pictures while travelling.

Figure 4:
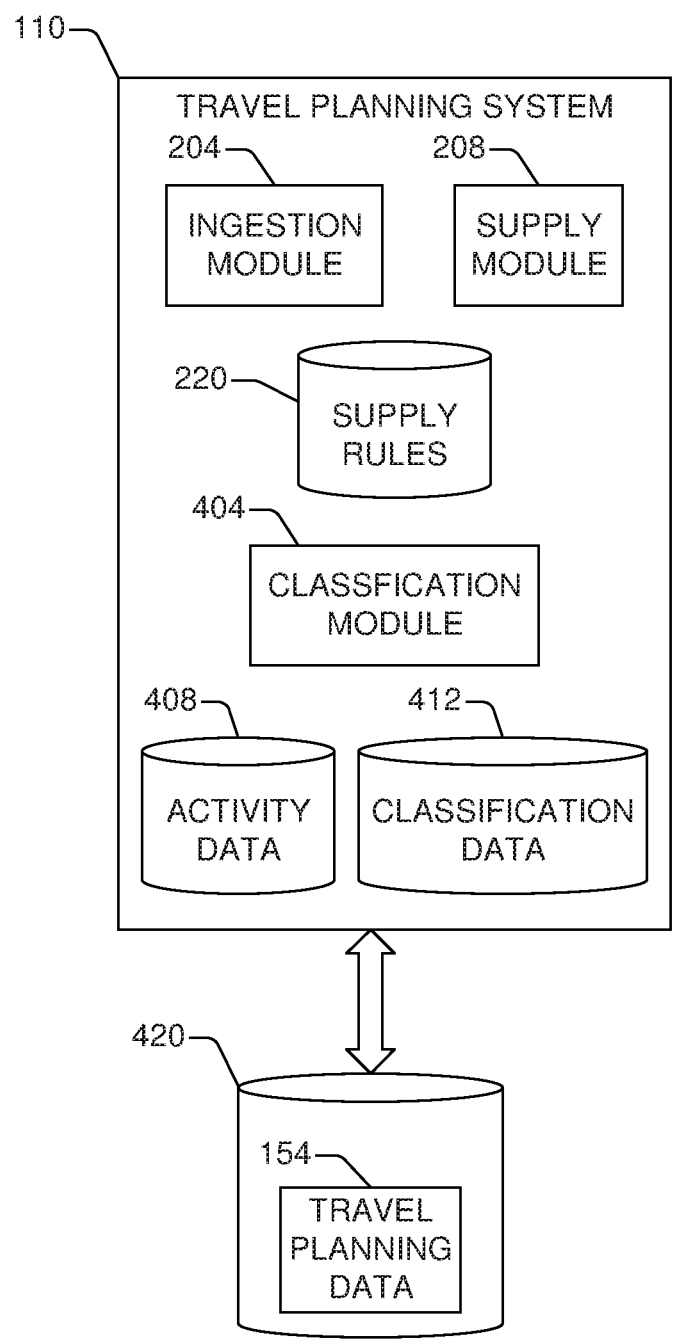
FIG. 4 presents an example of a computing system for dynamic delivery of crowdsourced travel information, in accordance with one or more embodiments of the disclosure.

The travel planning system 110 can classify a subscriber account as a defined type of traveler based at least on the user activity data received from the subscriber account. Simply for the sake of illustration, the defined type of travel can be one of "premium traveler," "business traveler," "budget traveler," "bargain traveler," "urban traveler," adventure traveler," "photography traveler," "epicurean traveler," or similar In some embodiments, as is illustrated in FIG. 4, the travel planning system 110 can include a classification module that can determine, using the user activity data, the defined type of traveler. To that end, the classification module 404 can implement various machine-learning techniques that permit assigning a type of traveler to the subscriber account from a set of defined types of traveler. In one example, the set of defined types of traveler can include "premium traveler," "budget traveler," "bargain traveler," Simply as an illustration, the machine-learning techniques can include trained neural networks of different complexities, such as a convolutional neural network or an adversarial neural network.

The travel planning system 110 shown in FIG. 4 can then determine if a supply rule to provide travel planning information is satisfied. The supply module 208 can determine, using travel condition(s) or a state of the subscriber account, or both, if the supply rule is satisfied. As mentioned, the supply rule can be retained in the supply rules 220. In response to determining that the supply rule is not satisfied, the travel planning system 110 can continue monitoring if the supply rule is satisfied in response to other data received at a later time. The other data identifying other travel condition(s) and/or state of the subscriber account, for example. The supply module 208 (FIG. 2) can determine if the supply rule is satisfied at the later time in some embodiments.

In the alternative, in response to determining that the supply rule is satisfied, the travel planning system 110 shown in FIG. 4 can acquire specific travel planning information using at least the defined type of traveler. For example, for a "selfie traveler," the specific travel planning information can include a list of potential locations for taking selfies or other types of pictures when traveling in a particular region. The specific travel planning information also can include data identifying of a route that includes at least one of the potential locations in the list while permitting arriving at a travel destination of the selfie traveler within a suitable time frame (e.g., preserving an intended arrival time). As a result, the specific travel planning information can permit the selfie traveler to take pictures of landmarks, for example, while still arriving at the destination at an intended arrival time or within an acceptable time frame. In some instances, the route identified by the travel planning information also can maintain other travel constraints of the selfie traveler within suitable limits. As another example, for "premium traveler" and "budget traveler" the specific travel planning information can include options consistent with their respective choices. More concretely, the specific travel planning information can be acquired using a combination of the defined type of traveler and at least a portion of the travel planning data 154 retained in at least one of the data storage devices 150. The supply module 208 can acquire the specific travel planning information.

The travel planning system 110 shown in FIG. 4 can provide the specific travel planning information to the mobile UE (e.g., the portable computing device 160 or the vehicle 170) corresponding to the subscriber account, for example. The travel planning system 110 (FIG. 4) can provide the specific travel planning information by sending a notification message to the mobile UE, for example. The supply module 208 (FIG. 2) can send the notification message. The notification message can cause the mobile UE to present the specific travel planning information. In one embodiment, the mobile UE can present such travel planning information by means of a display device 320 (FIG. 3) integrated into the mobile UE or otherwise functionally coupled thereto. For instance, the display device can display visual elements (graphics, text, or a combination of both) that convey the specific travel planning information. In addition, or in some embodiments, the specific travel planning information can be presented aurally by means of audio output units (e.g., an audio speaker; not shown in FIG. 3) integrated into the mobile UE or functionally coupled to the mobile UE.

Other types of travel planning information can be provided in response while a traveler is in transition between particular locations and in response to detecting that a supply rule is satisfied by using different smart technologies in a network of transportation means (which also can be referred to as a "mobility network"). The smart technologies can include, for example, devices and techniques for face recognition, in-vehicle sensor devices, camera devices, and the like. Face recognition can include, for example, recognition of a face expression. In one example scenario, a traveler may traverse a path from a first location to a second location using a particular means of transportation. A camera device may capture a face expression of the traveler and crowdsource similar expressions of other travelers using similar routes and condition.

Regardless of the particular mechanisms to supply travel planning information based on travel conditions, the disclosed technologies can permit planning a trip itinerary and/or activity more efficiently than conventional travel planning technologies. By using crowdsourced travel data, a travel planning system in accordance with aspects of this disclosure can permit accurate trip planning and routing. For instance, each person has a particular gait and is able to move on foot at a pace within a particular range. Therefore, for a travel condition of a subject that includes hiking a popular trail, the travel planning system can provide crowd-sourced estimate of a duration of the hike based on the travel condition instead of providing a generic global positioning system (GPS)-based estimate of the duration of the hike. The crowdsourced estimate constitutes a form of travel planning information and can based on many factors, such as previous subject's walking duration and steps for a similar or same hike; health condition and/or biometric data of the subject (weight and height); weather conditions or forecast on at the time planned for the hike; specific walking conditions (pushing a stroller, carrying luggage, etc.); a combination thereof; or similar. The disclose technologies also can provide accurate travel planning information for other types to travel activities that include traversing on foot a distance from a first location to a second location.

The travel planning system 110 also can provide other functionalities besides supplying travel planning data. The travel planning system 110 can grant incentives for receiving travel information from a supplier account pertaining to a traveler, for example. The travel planning system 110 can grant the incentives by assigning reward data to the supplier account, where the reward data defines an amount of incentives. Assigning reward data can include, in some configurations, generating the reward data and configuring a supplier profile to include the reward data. The supplier profile can be included in the supplier account. The incentives can include, for example, points or other types of tokens. Thus, the subscriber account that provides feedback, inputs, services, related suggestions in the crowdsourcing mobility network can receive points.

As an example, in an instance in which a subscriber account shares calendar data with the travel planning system 110, the calendar data may identify a time and/or meal preference (e.g., Asian food). Accordingly, when an Asian food provider is nearby an area corresponding to the subscriber account, and a server device of such provider receives the calendar data and traveling data, the Asian food provider can offer discounted Asian meals by granting points (or tokens) to the subscriber account. The server device can be included in the third-party service devices 190. Thus, the server device can send reward data defining the granted points to the travel planning system 110. The reward data can be sent by means of one or many of the network(s) 130. The travel planning system 110 can receive the reward data and can then assign the reward data to such subscriber account. In other instances, many subscriber accounts can include data identifying Asian food as a preference, and can share calendar data and travel data. In such instances, food providers that can supply Asian food can provide incentives.

A defined number of points (or, in some instances, tokens) can be redeemed for goods or services across a network of travel service providers and/or merchants. Such a network can be included in a transportation ecosystem. Simply as an illustration, the transportation ecosystem can include transportation means; smart infrastructure or other types of infrastructures, or both, that facilitate travel; and a network of computing equipment that permits communication amongst traveler devices and the management of user experience of travelers utilizing the transportation means. The transportation means include, for example, connected vehicles, bikes, scooters, trains, airplanes, a combination thereof, or similar A traveler that has a supplier account can book travel and buy goods and/or services using points granted to the supplier account. The travel planning unit 180 (FIG. 1) can permit accessing information that identifies points (or tokens) available to the supplier account. The travel planning unit 180 also can permit redeeming at least some of the points (or tokens) available to the supplier account. In some embodiments, as mentioned, the travel planning unit 180 can be a part of a web-browsing application or a mobile application retained in a mobile UE (a portable computing device or a vehicle, for example). Accordingly, travelers associated with a subscriber account can book travel (e.g., purchase tickets for a means of transportation or lodging stays) by redeeming points using the mobile application that includes the travel planning unit 180.

Figure 5:
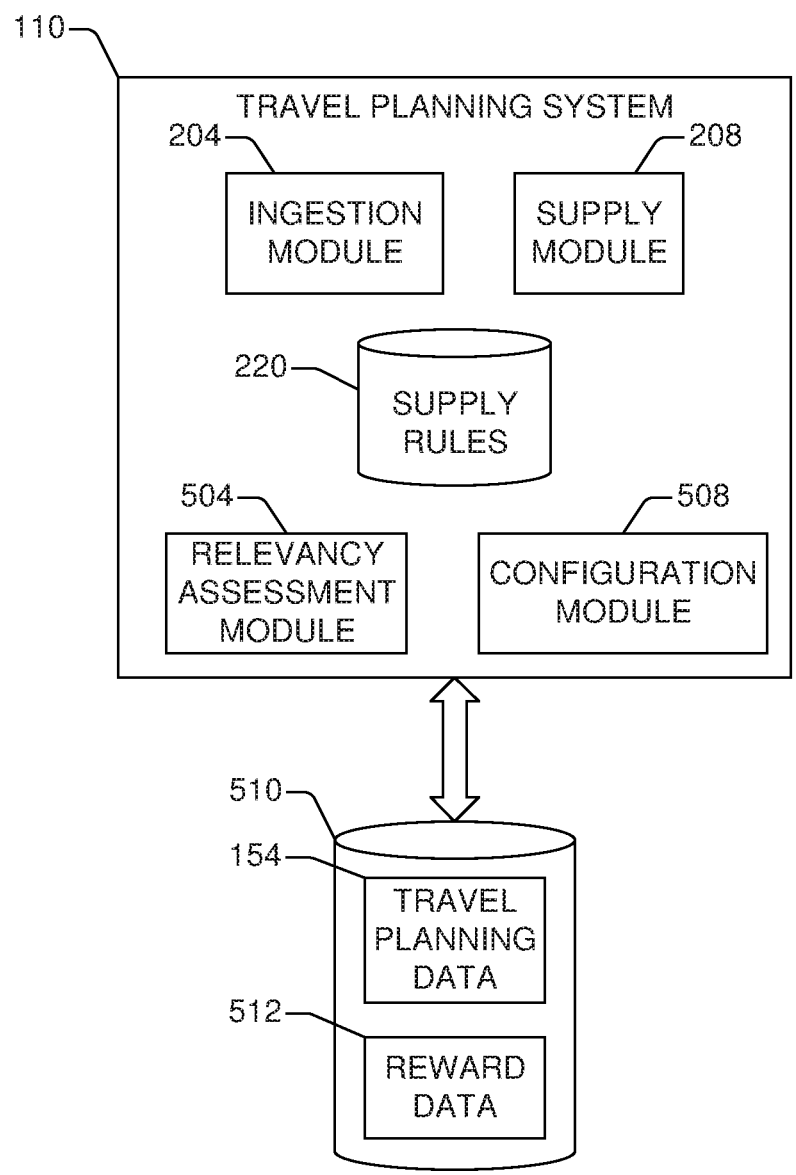
FIG. 5 presents another example of a computing system for dynamic delivery of crowdsourced travel information, in accordance with one or more embodiments of the disclosure.

More concretely, FIG. 5 illustrates an example of the travel planning system 110 that can grant incentives to a supplier account, in accordance with one or more embodiments of the disclosure. The travel planning system 110 illustrated in FIG. 5 can receive destination data identifying a characteristic of a travel destination from a supplier account. The ingestion module 204 can receive the destination data. The supplier account can be a particular supplied account of multiple supplier accounts that provide data identifying features of travel itineraries, for example.

As is illustrated in FIG. 5, the travel planning system 110 can include a relevancy assessment module 504 that can determine a relevancy score for the destination data. In some instances, the relevancy score can be a numerical metric the represents the uniqueness of the destination data relative to other information present in the travel planning data 154. Thus, for a travel destination for which travel information is scarce within the travel planning data 154, a first relevancy score of destination data identifying characteristics of the destination data can have a first relevancy score. Other destination data identifying characteristics of another travel destination for which travel information is readily available within the travel planning data 154 can have a second relevancy score. Here, the first relevancy score is greater than the second relevancy score. Similarly, destination data that is in demand at the travel planning system 110 can have a greater relevancy score than other destination data that is substantially redundant within the travel planning data 154. Destination data is in demand in the travel planning system 110 when, for example, travel information related to a travel destination is desired or otherwise absent within the travel planning data 154.

More concretely, as an illustration, when the travel planning data 154 within the distributed data storage platform 140 lacks details regarding services in Luxembourg, a supplier account that provides destination data corresponding to Luxembourg receive, or can be eligible to receive, additional points relative to another supplier account that provides destination data related to another destination.

The travel planning system 110 also can include a configuration module 508, as is shown in FIG. 5. The configuration module 508 can assign reward data to the supplier account based at least on the relevancy score. The reward data can define a number of points or another type of tokens. The greater the relevancy score, the greater the number of points being assigned to the supplier account. Accordingly, the configuration module 508 can generate the reward data by determining the number of points (or tokens) using a defined function of the relevancy score. The defined function can be single-valued and can increase with the relevancy score. The configuration module 508 can then update a record that identifies a current number of points for the supplier account. The current number of points results from adding the number of points and an extant number of points in the supplier account. The updated record can be retained in a data storage device 520, within one or more memory devices 512 (referred to as reward data 512). The data storage device 520 can be one of the data storage devices 150 in the distributed data storage platform 140 (FIG. 1).

Examples of the techniques that can be implemented in accordance with this disclosure can be better appreciated with reference to FIGS. 6-9. For purposes of simplicity of explanation, the exemplified methods in FIGS. 6-9 (and other techniques disclosed herein) are presented and described as a series of operations. It is noted, however, that the exemplified method and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

Figure 6:
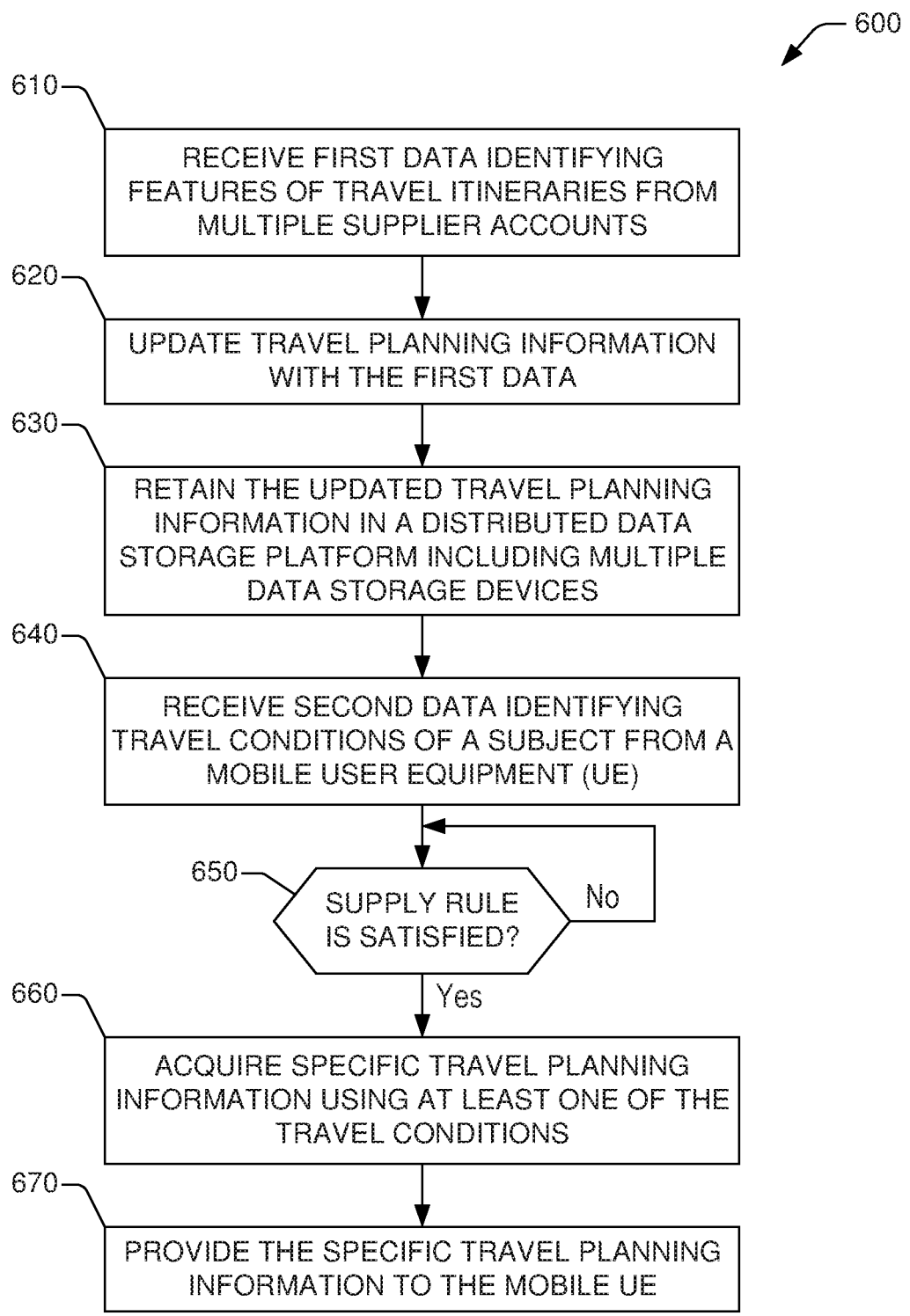
FIG. 6 presents an example of a method for dynamically delivering crowdsourced travel information, in accordance with one or more embodiments of the disclosure.

FIG. 6 is a flowchart of an example of a method 600 for supplying travel planning information, in accordance with one or more embodiments of this disclosure. A computing system can implement, entirely or partially, the example method 600. The computing system can embody the travel planning system 110 or both the travel planning system 110 and the distributed data storage platform 140 described herein. See FIG. 1. The computing system includes or is functionally coupled to one or more processors, one or more memory devices, other types of computing resources, a combination thereof, or the like. Such processor(s), memory device(s), and computing resource(s), individually or in a particular combination, permit or otherwise facilitate implementing the example method 600. The computing resources can include O/Ss; software for configuration and/or control of a virtualized environment; firmware; CPU(s); GPU(s); TPU(s); virtual memory; disk space; interface(s) (I/O interface devices, programming interface(s) (such as APIs, etc.); controller devices(s); power supplies; a combination of the foregoing; or the like. The computing resources available to the computing system also can include downstream communication bandwidth and/or upstream communication bandwidth.

At block 610, the computing system can receive first data identifying features of travel itineraries from multiple supplier accounts. For the sake of illustration, a supplier account is a source of travel information and can pertain to a frequent traveler, a travel expert, a travel agent, a resident of a travel destination or another particular location, or similar. At block 620, the computing system can update travel planning information with the first data. At block 630, the computing system can retain the updated planning information in a distributed data storage platform that includes multiple data storage devices. In some embodiment, a first data storage device of the multiple data storage devices is located in a first location. In addition, a second data storage device of the multiple data storage devices is located in a second location remote from the first location. Each one of the multiple data storage devices can include at least one memory device.

At block 640, the computing system can receive second data identifying travel conditions of a subject from a mobile UE (e.g., the portable computing device 160 or the vehicle 170; see FIG. 1). In one example, the travel conditions can include a health condition or biometric data, or both. The subject can be an end-user of the mobile UE or another party, such as a passenger in an automobile, a light-rail train, or a bus. At block 650, the computing system can determine if a supply rule to provide travel planning information is satisfied. In response to a negative determination ("No" branch) the computing system can continue monitoring if the supply rule is satisfied.

In the alternative, in response to a positive determination ("Yes" branch) flow of the example method 600 can proceed to block 660, where the computing system can acquire first travel planning information using at least one of the travel conditions. In one instance, the computing system can acquire the specific travel planning information using, at least in part, a combination of a portion of the updated travel planning information and a subset of the travel conditions. Accordingly, in one embodiment, acquiring the specific travel planning information includes selecting the specific travel planning information from the updated travel planning information using a first condition of the travel condition. In some embodiments, the subset of the travel conditions can include a health condition (e.g., a phobia, a chronic illness, or a contagious disease) and acquiring the specific travel planning information can include generating a recommendation for a specific seat in a transportation means. In yet another embodiment, rather than generating such a recommendation, the computing system can acquire the specific travel planning information by generating a reservation for the specific seat within the transportation means. As an illustration, the transportation means can be an aircraft, a bus, a train, a ship, or similar, where seat assignments are offered during travel.

At block 670, the computing system can provide the specific travel planning information to the mobile UE. Providing the first travel planning information can include causing the mobile UE to present the first travel planning information. In one example scenario, the computing system generates a notification message including the specific travel planning information and sends the notification message to the mobile UE. In response to being received at the mobile UE, the notification message causes the mobile UE to present the specific travel planning information at the mobile UE. Such information can be presented visually and/or aurally in accordance with aspects described herein.

Figure 7:
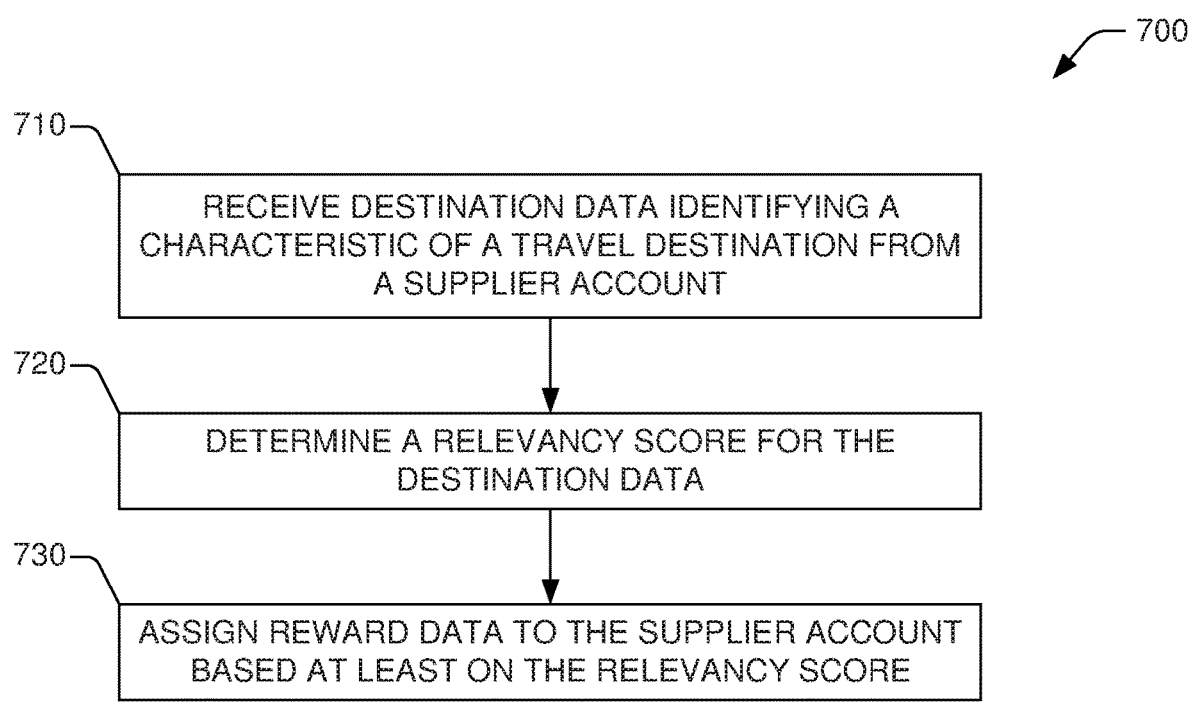
FIG. 7 presents an example of a method for granting incentives based on travel information, in accordance with one or more embodiments of the disclosure.

FIG. 7 is a flowchart of an example of a method 700 for configuring rewards for supplier accounts, in accordance with one or more embodiments of this disclosure. A computing system can implement, entirely or partially, the example method 700. The computing system can be, or can include, the computing system that implements the example method 600. At block 710, a computing system can receive destination data identifying a characteristic of a travel destination from a supplier account. In some embodiments, the destination data can be received as part of the implementation of block 610 in the example method 600 (FIG. 6). Thus, the supplier account can be a particular supplier account of multiple supplier accounts that provide data identifying features of travel itineraries.

At block 720, the computing system can determine a relevancy score for the destination data. At block 730, the computing system can assign reward data to the supplier account based at least on the relevancy score. The reward data can define, for example, a number of points or another types of tokens. In other configuration, the reward data can define a discount amount or a credit amount that can be applied towards a particular service or good. The greater the relevancy score, the greater the number of points being assigned to the supplier account. In an applicable configuration, the greater the relevancy score, the greater the discount or credit amount being assigned to the supplier account. In some embodiments, assigning reward data can include generating the reward data and configuring a supplier profile to include the reward data. The supplier profile can be included in the supplier account.

Figure 8:
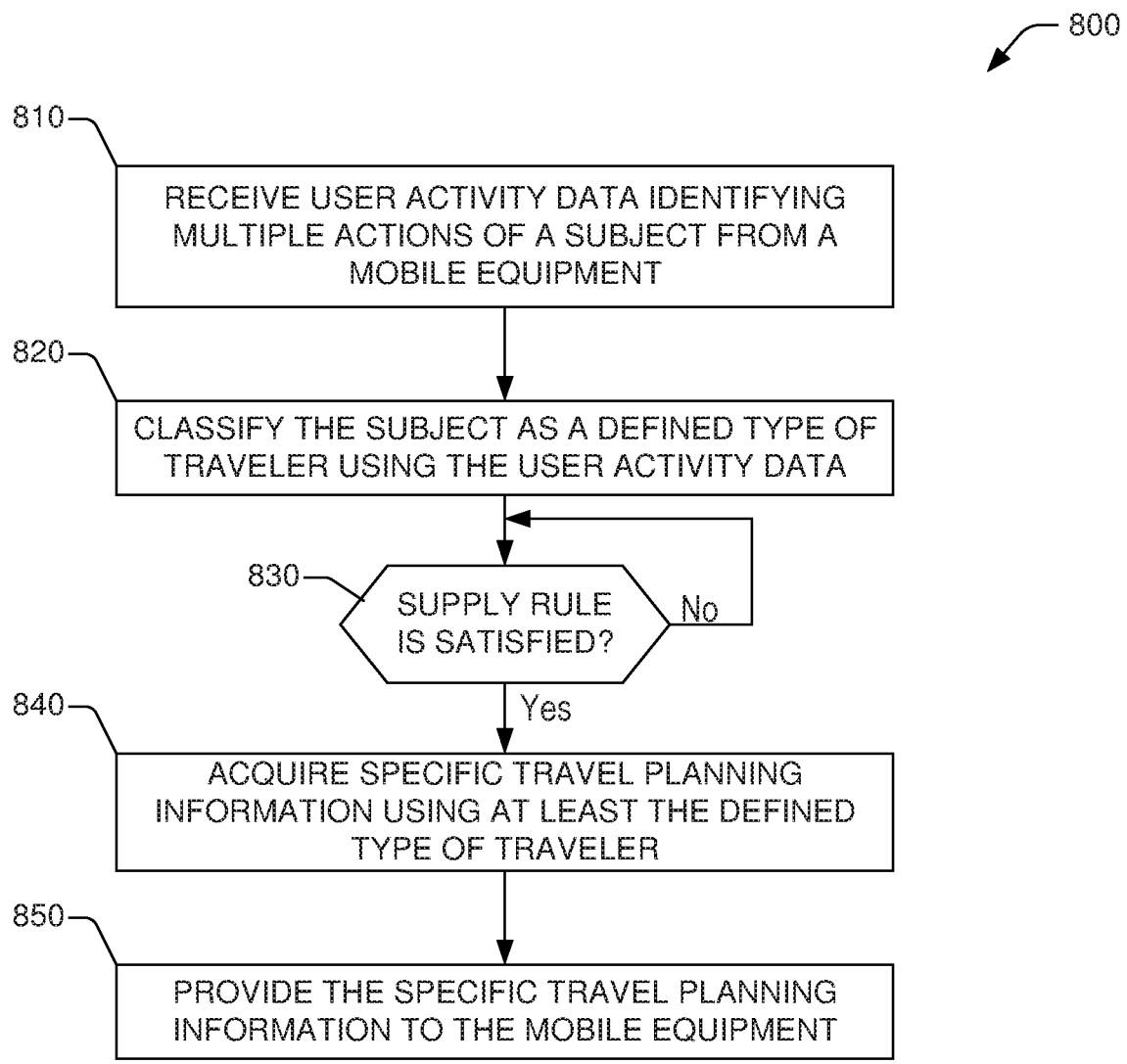
FIG. 8 presents another example of a method for dynamically delivering crowdsourced travel information, in accordance with one or more embodiments of the disclosure.

FIG. 8 is a flowchart of an example of a method 800 for supplying travel planning information customized to a traveler, in accordance with one or more embodiments of this disclosure. A computing system can implement, entirely or partially, the example method 800. The computing system can be, or can include, the computing system that implements one of the example method 600 or the example method 700, or both. At block 810 a computing system can receive user activity data identifying multiple actions of a subject from a mobile UE. At block 820, the computing system can classify the subject as a defined type of traveler using the user activity data.

At block 830, the computing system can determine if a supply rule to provide travel planning information is satisfied. In response to a negative determination ("No" branch) the computing system can continue monitoring if the supply rule is satisfied. In the alternative, in response to a positive determination ("Yes" branch) the flow of the example method 800 can continue to block 840, where the computing system can acquire specific travel planning information using at least the defined type of traveler. In some embodiments, acquiring the specific travel planning information can include either generating or selecting a list of potential locations for taking selfies or other types of scenic pictures in a particular region.

At block 850, the computing system can provide the specific travel planning information to the mobile UE. Providing the specific travel planning information can include causing the mobile UE to present the specific travel planning information. In one embodiment, the mobile UE can present the specific travel planning information by means of a display device (e.g., display device 320 (FIG. 3)) integrated into the mobile UE or otherwise functionally coupled to the mobile UE.

Figure 9:
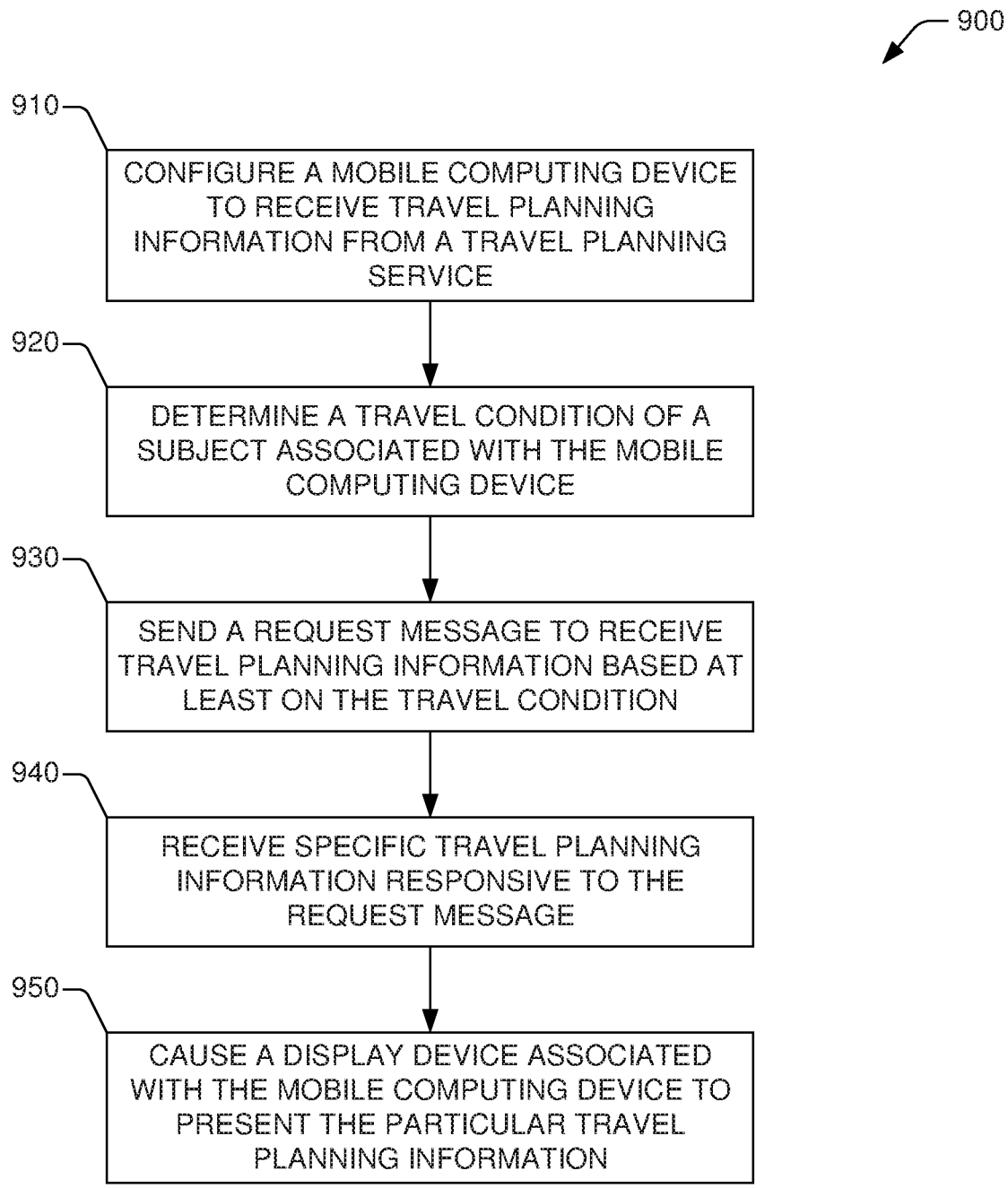
FIG. 9 presents another example of a method for consuming crowdsourced travel information, in accordance with one or more embodiments of the disclosure.

FIG. 9 is a flowchart of an example of a method 900 for accessing travel planning information dynamically, based on particular travel conditions, in accordance with one or more embodiments of this disclosure. Mobile UE in accordance with this disclosure can implement, entirely or partially, the subject example method 900. In some configurations, a processing device integrated into the mobile UE can implement, entirely or partially, the example method 900. At block 910, a processing device can configure a mobile computing device to receive travel planning information from a travel planning service. The mobile computing device can be integrated into the mobile UE or, in some embodiments, can constitute the mobile UE. As an example, in an instance in which the mobile UE is a vehicle (e.g., vehicle 170, FIG. 1), the mobile computing device can be embodied in, or can be a part of, an in-vehicle infotainment (IVI) system. A computing system remotely located relative to the mobile UE can provide the travel planning service. The computing device can include the processing device. As mentioned, the travel planning information can be retained in a data storage platform that includes multiple data storage devices. Each one of the multiple data storage devices can include at least one memory device. The data storage platform can be the distributed data storage platform 140 (FIG. 1), for example.

At block 920, the processing device can determine a travel condition of a subject associated with the mobile computing device. The subject can be, for example, an end-user operating the mobile computing device and/or consuming digital content supplied by the mobile computing device. For instance, the subject can be an operator or an occupant of a vehicle that includes the mobile computing device (e.g., an IVI system). The travel condition can include, for example, a health condition or biometric data, or both, and can be determined by the processing device by using one or many rules. Such rules can be similar, if not the same, as the rules retained in the supply rules 220. The rules utilized to determine the travel condition of the subject can be retained in one or more memory devices of the mobile UE, where at least one of such devices can be functionally coupled to the processing device.

At block 930, the processing device can send a request message to receive travel planning information based at least on the defined travel condition. The request message is sent to the computing system that provides the travel planning service. The processing device can send the required message to such a computing system by means of a communication unit integrated into the mobile UE, for example. The communication unit can be the communication unit 310 (FIG. 3).

At block 940, the processing device can receive specific travel planning information in response to the request message. Such information is received from the computing system that provides the travel planning service. For example, the computing system can embody, or can include, the travel planning system 110 (FIG. 1) and a component therein can send the specific travel information. Such a component can embody, or can be a part of, the supply module 208 (FIG. 2) in some embodiments.

At block 950, the processing device can cause a display device associated with the mobile computing device to present the specific travel planning information. In one configuration, the display device can be integrated into the mobile computing device. In another configuration, the display device can be functionally coupled to the mobile computing device. In such a configuration, in an example vehicular scenario, the display device can be a dashboard mounted display device. The display device can be, for example, the display device 320 (FIG. 3).

Figure 10:
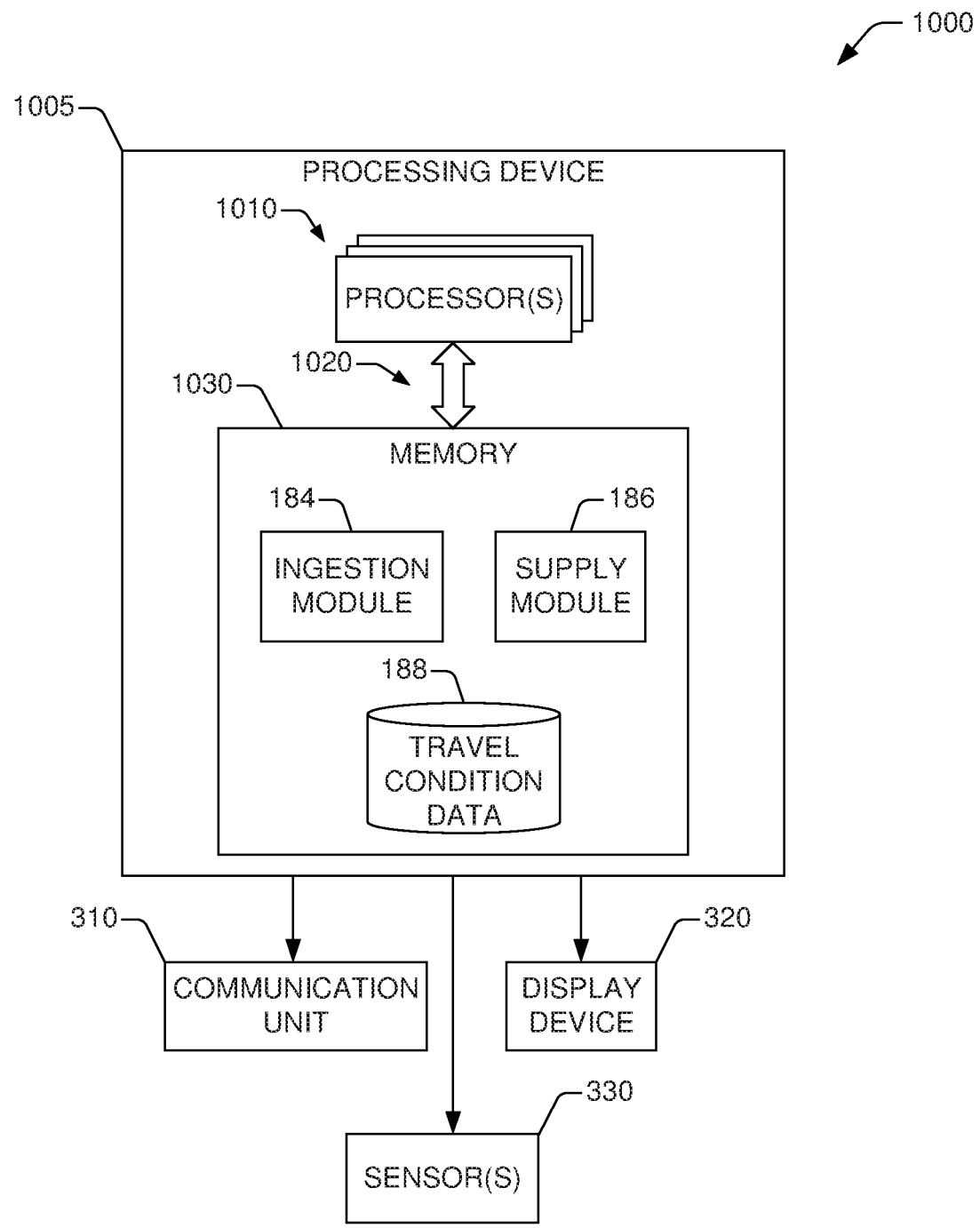
FIG. 10 presents another example of components of a mobile user equipment (UE) to consume crowdsourced travel information, in accordance with one or more embodiments of the disclosure.

FIG. 10 is a block diagram of an example of mobile user equipment 1000 for dynamic delivery of crowdsourced travel information, in accordance with one or more embodiments of the disclosure. The apparatus 1000 can embody, or can constitute, a mobile UE in accordance with this disclosure. Thus, as is illustrated, the apparatus includes a processing device 1005, the communication unit 310, the display device 320, and the sensor(s) 330. The processing device 1005 can embody, or can be a part of, a computing device integrated in the UE 1000. In some embodiments, the processing device 1005, the communication unit 310, the display device 320, and the sensor(s) 330 can collectively be integrated into a portable computing device or a vehicle.

The processing device 1005 can include one or more processors 1010 and one or more memory devices 1030 (referred to as memory 1030) that include machine-accessible instructions (e.g., computer-readable and/or computer-executable instructions) that can be accessed and executed by at least one of the processor(s) 1010. The processor(s) 1010 can be embodied in, or can include, for example, a GPU; multiple GPUs; a CPU; multiple CPUs; an application-specific integrated circuit (ASIC); a microcontroller; a programmable logic controller (PLC); a field programmable gate array (FPGA); a combination thereof; or the like. In some embodiments, the processor(s) 1010 can be arranged in a single computing device (e.g., an electronic control unit (ECU), an in-car infotainment (ICI) system, or the like). In other embodiments, the processor(s) 1010 can be distributed across two or more computing devices (e.g., multiple ECUs; a combination of an ICI system and one or many ECUs; or the like).

The processor(s) 1010 can be functionally coupled to the memory 1030 by means of a communication architecture 1020. The communication architecture 1020 is suitable for the particular arrangement (localized or distributed) of the processor(s) 1010. In some embodiments, the communication architecture 1020 can include one or many bus architectures, such an Ethernet-based industrial bus, a controller area network (CAN) bus, a Modbus, other types of fieldbus architectures, a combination thereof, or the like.

As is illustrated in FIG. 10, the memory 1030 includes the ingestion module 184 and the supply module 186. Machine-accessible instructions embody or otherwise constitute each one of such modules. In some embodiments, the machine-accessible instructions are encoded in the memory 1030 and can be arranged in components that can be built (e.g., linked and compiled) and retained in computer-executable form in the memory 1030 (as is shown) or in one or more other machine-accessible non-transitory storage media. In other embodiments, the machine-accessible instructions can be assembled as circuitry or other types of hardware components.

At least one of the processor(s) 1010 can execute, individually or in combination, the ingestion module 184 and the supply module 184 to cause the processing device 1005 to perform functions for automated control of provision of a product or service in accordance with this disclosure. The memory 1030 also can include various data that can be utilized, individually or in combination, as part of the execution of at least one of such modules. As is illustrated, the memory 1030 can include the travel condition data 188. While not shown in FIG. 10, the memory 1030 can include rules to determine a travel condition (e.g., a health condition) of a subject associated with the mobile UE 1000. As mentioned, such rules can be similar, if not the same, as the supply rules 220 (FIG. 2).

While not illustrated in FIG. 10, the processing device 1005 also can include other types of computing resources that can permit or otherwise facilitate the execution of at least one of the ingestion module 184 or the supply module 184. The computing resources can include, for example, several interfaces (such as I/O interfaces, APIs, and/or a wireless communication adapter or another type of wireless communication component). In addition, or as another example, the computing resource(s) can include controller devices(s), power supplies, an O/S, a firmware, a combination thereof, or the like.

Figure 11:
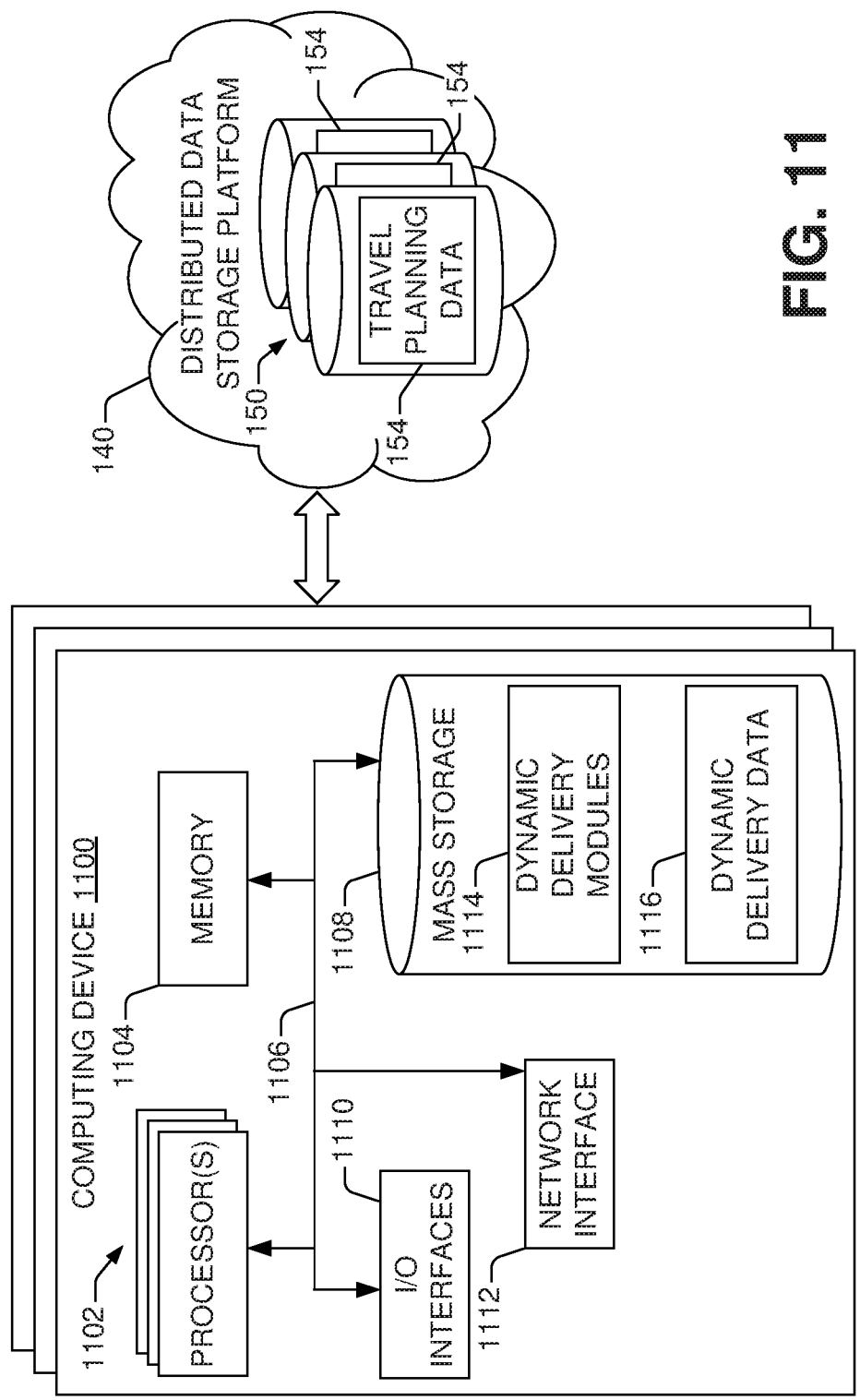
FIG. 11 presents an example of a computing environment for dynamic delivery of crowdsourced travel information, in accordance with one or more embodiments of this disclosure.

FIG. 11 illustrates a computing environment for the automated configuration of provision of a product or service, in accordance with one or more embodiments of this disclosure. The computing environment can include multiple computing devices 1100 that can be used in accordance with aspects of this disclosure. In some embodiments, a first combination of the computing devices 1100 can embody the travel planning system 110 and a second combination of the computing devices 1100 can embody the distributed data storage platform 140. Each computing device 1100 includes at least one processor 1102 that executes instructions that are stored in one or more memory devices (referred to as memory 1104). The instructions can be, for instance, instructions for implementing functionality described as being carried out by one or more modules and systems disclosed above or instructions for implementing one or more of the methods disclosed above. The processor(s) 1102 can be embodied in, for example, a CPU, multiple CPUs, a GPU, multiple GPUs, a multi-core processor, a combination thereof, and the like. In some embodiments, the processor(s) 1102 can be arranged in a single computing device. In other embodiments, the processor(s) 1102 can be distributed across two or more computing devices (e.g., multiple CPUs; multiple GPUs; a combination thereof; or the like).

The processor(s) 1102 can access the memory 1104 by means of a communication architecture 1106 (e.g., a system bus). The communication architecture 1106 is suitable for the particular arrangement (localized or distributed) and type of the processor(s) 1102. In some embodiments, the communication architecture 1106 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCM-CIA) bus, a Universal Serial Bus (USB), and or the like.

In addition to storing executable instructions, the memory 1104 also can retain in some instances one or a combination of user activity data, supply rules, travel planning data, and so forth. The type of data retained in the memory 1104 can be based on the functionality of the computing device 1100. First types of data can be retained in the memory 1104 in instances in which the computing device 1100 embodies, or is a part of, the travel planning system 110. Second types of data can be retained in the memory 1104 in instances in which the computing device 1100 embodies, or is a part of, the distributed data storage platform 140.

Each computing device 1100 additionally can include mass storage 1108 that is accessible by the processor(s) 1102 by means of the communication architecture 1106. The mass storage 1108 can include machine-accessible instructions (e.g., computer-readable instructions and/or computer-executable instructions). In some embodiments, the machine-accessible instructions are encoded in the mass storage 1108 and can be arranged in components that can be built (e.g., linked and compiled) and retained in computer-executable form in the mass storage 1108 or in one or more other machine-accessible non-transitory storage media included in the computing device 1100. Such components can embody, or can be a part of, one or more of the various modules disclosed herein. Such modules are illustrated as dynamic delivery modules 1114.

Execution of the dynamic delivery modules 1114, individually or in combination, by at least one of the processor(s) 1102, can cause the computing device 1100 to provide at least some of the functionality disclosed herein for dynamic delivery of crowdsourced travel planning information. For instance, execution of the dynamic delivery modules 1114, individually or in combination, can cause the computing device 1100 to implement one or many of the techniques disclosed herein.

The mass storage 1108 also can retain data that can be utilized to implement the functionality disclosed herein for dynamic delivery of crowdsourced travel planning information, or that can result from the implementation of such functionality. Such data are illustrated as dynamic delivery data 1116 and can include, for example, one or a combination of user activity data, supply rules, travel planning data, and the like.

Each computing device 1100 also can include one or more input/output interface devices 1110 (referred to as I/O interface 1110) that can permit or otherwise facilitate external devices to communicate with the computing device 1100. For instance, the I/O interface 1110 may be used to receive and send data and/or instructions from and to an external computing device. The computing device 1100 also includes one or more network interface devices 1112 (referred to as network interface(s) 1112) that can permit or otherwise facilitate functionally coupling the computing device 1100 with one or many external devices. Functionally coupling the computing device 1100 to an external device can include establishing a wireline connection or a wireless connection between the computing device 1100 and the external device.

The disclosed operational environments (e.g., system(s), device(s), etc.) and methods may take the form of an entirely hardware embodiment, an entirely software embodiment, or an embodiment combining hardware and software elements. The methods and computing systems also may take the form, in some embodiments, of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or operations or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures in order to optimize space usage or enhance the performance of systems, devices, or other electronic equipment in accordance with this disclosure. For instance, a processor can include molecular transistors and/or quantum-dot based transistors, switches, and gates.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The flowchart and block diagrams in the figures illustrate the architecture, functionality, and operation of possible implementations of examples of systems, methods, and computer program products according to various embodiments of the present disclosure. In this regard, each block in the flowchart or block diagrams may represent a module, segment, or portion of instructions, which includes one or more machine- or computer-executable instructions for implementing the specified operations. It is noted that each block of the block diagrams and/or flowchart illustration, and combinations of blocks in the block diagrams and/or flowchart illustration, can be implemented by special purpose hardware-based systems that perform the specified functions or operations or carry out combinations of special purpose hardware and computer instructions.

Computer-readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable non-transitory storage medium within the respective computing/processing device.

What has been described herein in the present specification and annexed drawings includes examples of systems, devices, techniques, and computer program products that, individually and in combination, permit dynamic delivery of crowdsourced travel information. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure

What we claim is:

1. A computer-implemented method, comprising:
   determining, via one or more processors, travel planning information using at least data from multiple supplier accounts, the data identifying features of travel itineraries and the determined travel planning information being retained in a distributed storage platform including multiple data storage devices;
   receiving, via the one or more processors and from a mobile user equipment (UE), data captured by a sensor of the mobile UE identifying travel conditions of a subject, the travel conditions including one or more of a health condition or biometric data of the subject, wherein the mobile UE is an autonomous vehicle;
   determining, via the one or more processors, crowdsourced data associated with a location of the mobile UE, wherein the crowdsourced data is obtained from at least one additional UE;
   determining, via the one or more processors, that a rule to provide particular travel planning information to the mobile UE is satisfied, wherein the rule comprises detection of a contagious disease of the subject based on the health condition or the biometric data;
   acquiring, via the one or more processors and based on the crowdsourced data relating to the location and the determination that the rule is satisfied, specific travel planning information using, at least in part, a subset of the travel conditions and the determined travel planning information, wherein acquiring the specific travel planning information comprises reserving a first seat of a second vehicle instead of a second seat of the second vehicle responsive to the detection of the contagious disease and identifying a route to the second vehicle;
   providing, via the one or more processors, the specific travel planning information to the mobile UE; and
   autonomously controlling the mobile UE to move to the second vehicle based on the route.

2. The method of claim 1, wherein the acquiring comprises selecting the specific travel planning information from the determined travel planning information using a first condition of the travel conditions.

3. The method of claim 1, wherein the second vehicle includes a taxi.

4. The method of claim 1, wherein the contagious disease is a viral disease.

5. The method of claim 1, wherein the providing comprises sending a notification message to the mobile UE that causes the mobile UE to present the specific travel planning information.

6. The method of claim 1, further comprising:
   receiving the data identifying the features of the travel itineraries from the multiple supplier accounts, wherein a first supplier account of the multiple supplier accounts pertains to a pre-defined destination in a pre-defined region;
   updating records defining the travel planning information using the data identifying the features of the travel itineraries; and
   retaining the updated travel planning information in the distributed data storage platform, wherein a first data storage device of the multiple data storage devices is located in a first location, and wherein a second data storage device of the multiple data storage devices is located in a second location.

7. The method of claim 6, wherein the receiving the data identifying the features of the travel itineraries comprises receiving data identifying a characteristic of a travel destination from the first supplier account of the multiple supplier accounts, the method further comprising,
   determining a relevancy score for the data identifying the characteristic of the travel destination; and
   assigning reward data to the first supplier account using at least the relevancy score.

8. The method of claim 1, further comprising,
   receiving, from the mobile UE, user activity data identifying multiple actions of the subject; and
   classifying the subject as a defined type of traveler based at least on the user activity data, the classifying including determining the defined type of traveler from multiple types of travelers by applying a machine-learning technique to the user activity data.

9. The method of claim 8, further comprising,
   determining that a second rule to provide particular travel planning information to the mobile UE is satisfied;
   acquiring second specific travel planning information using at least the defined type of traveler and the updated travel planning information; and
   providing the second specific travel planning information to the mobile UE.

10. A computing system, comprising:
    a processor; and
    a memory device functionally coupled to the processor, the memory device having instructions encoded thereon that, in response to execution by the processor, cause the computing system to:
       determine travel planning information using at least data from multiple supplier accounts, the data identifying features of travel itineraries and the determined travel planning information being retained in a distributed storage platform including multiple data storage devices;
       receive, from a mobile user equipment (UE), data captured by a sensor of the mobile UE identifying travel conditions of a subject, the travel conditions including one or more of a health condition or biometric data of the subject, wherein the mobile UE is an autonomous vehicle;
       determine crowdsourced data associated with a location of the mobile UE, wherein the crowdsourced data is obtained from at least one additional UE;
       determine that a rule to provide travel planning information to the mobile UE is satisfied, wherein the rule comprises detection of a contagious disease of the subject based on the health condition or the biometric data;
       acquire, based on the crowdsourced data relating to the location and the determination that the rule is satisfied, specific travel planning information using, at least in part, a subset of the travel conditions and the determined travel planning information, wherein acquiring the specific travel planning information comprises reserving a first seat of a second vehicle instead of a second seat of the second vehicle responsive to the detection of the contagious disease and identifying a route to the second vehicle;

provide the specific travel planning information to the mobile UE; and
    autonomously control by the mobile UE to move to the second vehicle based on the route.

11. The computing system of claim 10, wherein providing the defined travel planning information to the mobile UE comprises sending a notification message to the mobile UE that causes the mobile UE to present the specific travel planning information.

12. The computing system of claim 10, wherein determining the travel planning information comprises:
    receiving the data identifying the features of the travel itineraries from the multiple supplier accounts, wherein a first supplier account of the multiple supplier accounts pertains to a pre-defined destination in a pre-defined region;
    updating records defining the travel planning information using the data identifying the features of the travel itineraries; and
    retaining the updated travel planning information in the distributed data storage platform, wherein a first data storage device of the multiple data storage devices is located in a first location, and wherein a second data storage device of the multiple data storage devices is located in a second location.

13. The computing system of claim 12, wherein receiving the data identifying the features of the travel itineraries comprises receiving data identifying a characteristic of a travel destination from the first supplier account, and wherein the memory device has further instructions encoded thereon that, in response to execution by the processor, cause the computing system to:
    determine a relevancy score for the data identifying the characteristic of the travel destination; and
    assign reward data to the first supplier account using at least the relevancy score.

14. The computing system of claim 10, wherein the memory has further instructions encoded thereon that, in response to execution by the processor, cause the computing system to:
    receive, from the mobile UE, user activity data identifying multiple actions of the subject; and
    classify the subject as a defined type of traveler based at least on the user activity data, wherein classifying the subject comprises determining the defined type of traveler from multiple types of travelers by applying a machine-learning technique to the user activity data.

15. The computing system of claim 14, wherein the memory has further instructions encoded thereon that, in response to execution by the processor, cause the computing system to:
    determine that a second rule provide particular travel planning information to the mobile UE is satisfied;
    acquire second specific travel planning information using at least the defined type of traveler and the updated travel planning information; and
    provide the second specific travel planning information to the mobile UE.

* * * * *